US007691222B2

(12) United States Patent
Kuntz et al.

(10) Patent No.: US 7,691,222 B2
(45) Date of Patent: Apr. 6, 2010

(54) FLEXIBLE TOOLING METHOD AND APPARATUS

(75) Inventors: Michael P. Kuntz, Snohomish, WA (US); Mark L. Younie, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/128,328

(22) Filed: May 28, 2008

(65) Prior Publication Data

US 2009/0295015 A1 Dec. 3, 2009

(51) Int. Cl.
*B32B 37/10* (2006.01)

(52) U.S. Cl. ........................ 156/285; 264/511; 264/225

(58) Field of Classification Search ................. 264/225, 264/220, DIG. 78, 511, 553, 259, 263; 156/245, 156/242, 212, 285
See application file for complete search history.

(56) References Cited

U.S. PATENT DOCUMENTS 2,488,922 A 11/1949 Mead
2,513,785 A 7/1950 Browne
2,770,823 A 11/1956 Kamborian
3,334,383 A * 8/1967 Irvine ........................ 425/389
3,546,740 A * 12/1970 Johnson ...................... 425/89
4,160,000 A 7/1979 Hutto et al.
4,838,973 A * 6/1989 Mentzer et al. ............. 156/212
4,931,242 A 6/1990 Uchimura et al.
5,286,528 A * 2/1994 Reafler .................... 427/412.1
5,492,466 A * 2/1996 Frailey ...................... 425/389
6,484,776 B1 * 11/2002 Meilunas et al. ............ 156/382
7,144,612 B2 * 12/2006 LaFave et al. ................. 428/31
7,267,542 B2 * 9/2007 Younie et al. .............. 425/389
2007/0290389 A1 12/2007 Younie et al.

* cited by examiner

*Primary Examiner*—Khanh Nguyen
*Assistant Examiner*—Vishal I Patel
(74) *Attorney, Agent, or Firm*—Yee & Associates, P.C.; Brett L. Halperin

(57) ABSTRACT

A molding apparatus comprises an upper molding box, a lower mold box, an upper flexible membrane covering an opening of the upper mold box, a lower flexible membrane covering an opening of the lower mold box, a heating system located in the upper mold box, a set of ports located between the upper flexible membrane and the lower flexible membrane capable of being used to draw a vacuum between the upper flexible membrane and the lower flexible membrane, and a displacement system located in the lower mold box under the lower flexible membrane.

13 Claims, 17 Drawing Sheets

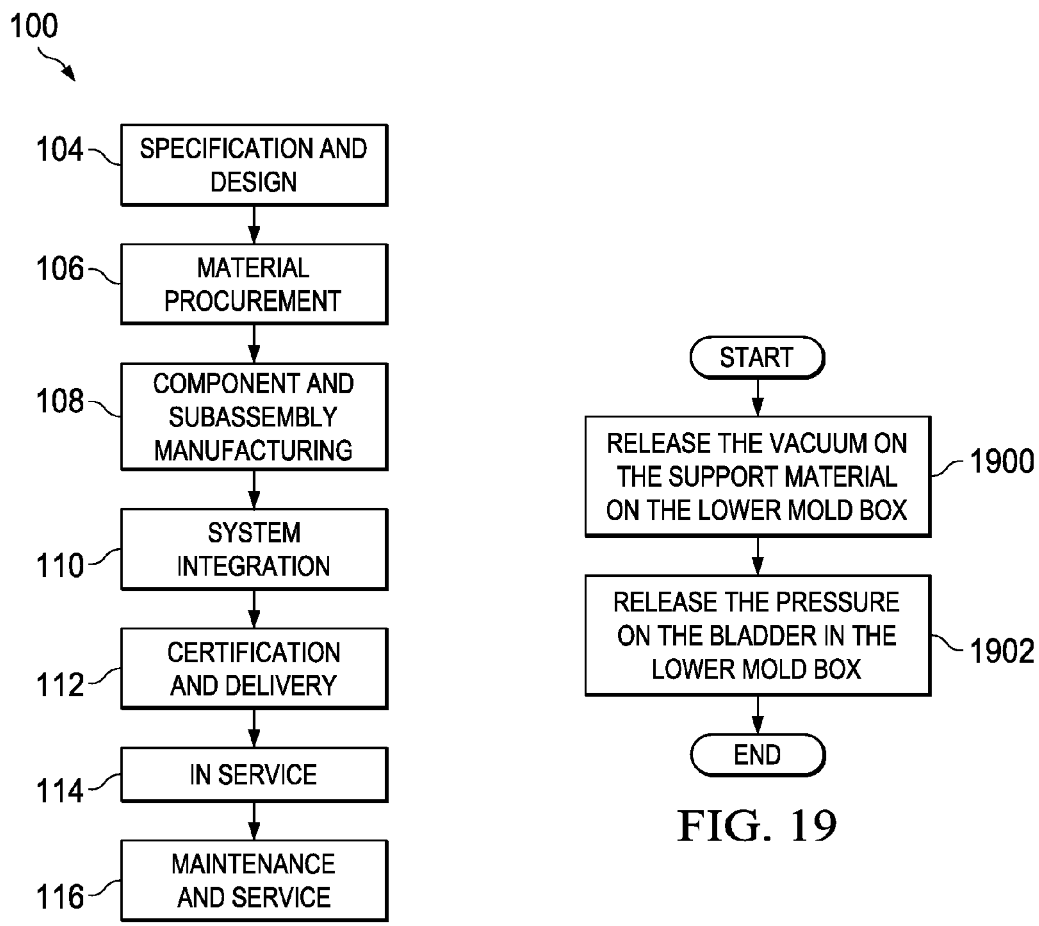
FIG. 1
FIG. 19
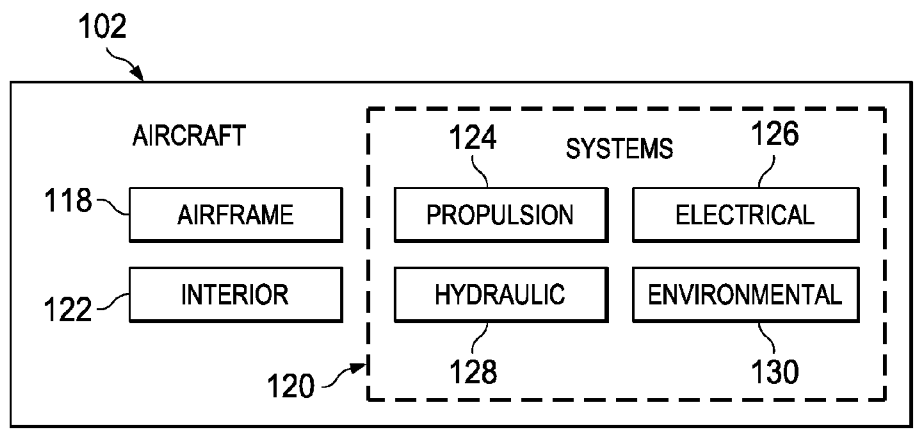
FIG. 2

602
611
622
630
700
637
604
616
612
623
638
618
624
706
634
610
600
608
613
704
802
632
644
800
640
606
642
614
609
628
636
$P_1$
$P_2$
$V_1$ 602
611
622
630
700
637
604
616
612
623
618
624
634
706
610
600
613
608
704
644
802
632
800
640
606
623
642
614
609
622
628
700
636

616
611
602
622
630
1400
$V_1$
637
900
$V_2$
604
612
618
623
610
608
606
613
1300
646
1206
1204
1202
1200
624
634
640
600
802
632
$P_2$
614
609
628
636
642

FLEXIBLE TOOLING METHOD AND APPARATUS

BACKGROUND INFORMATION

1. Field

The present disclosure relates generally to manufacturing components and in particular to a method and apparatus for manufacturing components using tools. Still more particularly, the present disclosure relates to a method and apparatus for manufacturing components using molding processes with tools.

2. Background

Molding is a process of manufacturing in which a material is shaped using a tool. This type of tool also may be referred to as a mold. These types of processes may be used during the manufacturing of aircraft and other vehicles. In particular, molding processes may be used to manufacture different parts of aircraft interiors. These parts may include, for example, without limitation, ceiling panels, wall panels, doors, side walls, and other suitable parts.

In manufacturing parts, a two part mold may be used. This two part mold may include a lower side and an upper side. Materials may be placed onto the lower side of the two part mold. These materials may be laid by hand and/or by a computer controlled tool or device. After placement of the materials on the lower side, the upper side may be placed over the lower side to encompass the materials laid on the lower side. Thereafter, the upper and lower sides with these materials may be cured in an oven and may be subjected to vacuum forces during the curing process.

The molds used to manufacture these parts may be dedicated for a specific part. These types of molds may be cost effective when enough parts are manufactured over a long enough period of time.

However, design changes may occur to a part. Even a slight design change may require a change to a mold for the part. Examples of design changes, without limitation, which can occur, include minor or major contour changes, and/or corrections or revisions to the molded part to accommodate interface with the addition of a new detail and/or subassembly. With a change in the design of the part, the mold may need to be modified. In some cases, a new mold may be needed to manufacture the part.

Modifying a mold may take time and may render the mold useless until the mold has been modified. Manufacturing a new mold may be costly and time consuming. A new mold may have to be ordered from an outside source. As a result, manufacturing the part with the design change may not occur until receipt of the new mold has occurred. As a result, interruptions and gaps in the supply of manufactured parts for an aircraft may occur. These gaps and interruptions may lead to increased time needed to manufacture an aircraft, as well as increasing the costs.

Accordingly, there is a need for a method and apparatus for minimizing the problems described above. In addition, the logistical issues of managing the utilization and/or availability of numerous molding tools within the defined confines of the factory floor may be present. Tool utilization and/or availability may be a major dynamic, which must be managed in any successful manufacturing operation.

SUMMARY

In one advantageous embodiment, a molding apparatus comprises an upper molding box, a lower mold box, an upper flexible membrane covering an opening of the upper mold box, a lower flexible membrane covering an opening of the lower mold box, a heating system located in the upper mold box, a set of ports located between the upper flexible membrane and the lower flexible membrane capable of being used to draw a vacuum between the upper flexible membrane and the lower flexible membrane, and a displacement system located in the lower mold box under the lower flexible membrane.

In another advantageous embodiment, an apparatus comprises an upper mold box, a lower mold box, an upper flexible membrane covering an opening of the upper mold box, a lower flexible membrane covering an opening of the lower mold box, a heating system located in the upper mold box, a set of ports located between the upper flexible membrane and the lower flexible membrane and a displacement system having a vibration unit and a bladder located in the lower mold box under the lower flexible membrane. The set of ports may be capable of being used to draw a vacuum between the upper flexible membrane and the lower flexible membrane. The displacement system may be capable of displacing a support material to conform to a shape of a part placed between the upper flexible membrane and the lower flexible membrane to form a conformed surface. The bladder may be capable of being inflated to displace the support material, and the vibrating unit may be capable of placing the support material into a pliable state.

In yet another advantageous embodiment, a method is present for processing a part. The part may be placed between an upper flexible membrane and a lower flexible membrane in a molding apparatus. A vacuum may be applied between the upper flexible membrane and the lower flexible membrane. A support material located under the lower flexible membrane may be placed to conform to a shape of the part to form a conformed surface. The support material may be stiffened after the support material has conformed to the shape of the part to form the conformed surface such that the support material and the lower flexible membrane substantially maintain the conformed surface.

In a different advantageous embodiment, an apparatus for processing aircraft parts comprises an upper mold box, a lower mold box, an upper flexible membrane covering an opening of the upper mold box, a lower flexible membrane covering an opening of the lower mold box, a set of ports, and a heating system located in the upper mold box. The set of ports is capable of being used to apply a vacuum between the upper flexible membrane and the lower flexible membrane. The displacement system has a vibration unit and a bladder located in the lower mold box under the lower flexible membrane. The displacement system is capable of displacing a support material comprising a plurality of spheres to conform to a shape of a part placed between the upper flexible membrane and the lower flexible membrane to form a conformed surface in which the bladder is capable of being inflated to displace the support material and the vibration unit is capable of placing the support material into a pliable state.

In still another advantageous embodiment, a method is present for processing aircraft parts. A master part is placed between an upper flexible membrane and a lower flexible membrane in a molding apparatus. A vacuum is applied between the upper flexible membrane and the lower flexible membrane. A support material located under the lower flexible membrane is displaced to conform to a shape of the master part to form a conformed surface by agitating the support material and inflating a bladder located under the support material, wherein the support materials comprises a plurality of spheres. Pressure is applied to the upper flexible membrane. The support material is stiffened after the support material has conformed to the shape of the master part to form the conformed surface by applying a second vacuum to the support material, wherein the second vacuum compacts the support material such that the support material and the lower flexible membrane substantially maintain the conformed surface, wherein the support material and the lower flexible membrane substantially maintain the conformed surface. The master part is removed after the conformed surface has been formed and the support material has been stiffened. A layer of a heat activated adhesive is placed on the surface of a preform. The preform is placed on the conformed surface. A decorative layer is placed over the preform. A vacuum is applied between the preform and the decorative layer, wherein the decorative layer conforms to a surface of the part. Heat is applied to the heat activated adhesive. The vacuum applied between the preform and the decorative layer is released after the heat activated adhesive has attached the decorative layer to the preform The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is a flow diagram of aircraft production and service methodology in accordance with an advantageous embodiment;

FIG. 2 is a block diagram of an aircraft in accordance with an advantageous embodiment;

FIG. 19 is a flowchart of a process for deconfiguring a molding apparatus in accordance with an advantageous embodiment.

DETAILED DESCRIPTION

Figure 3:
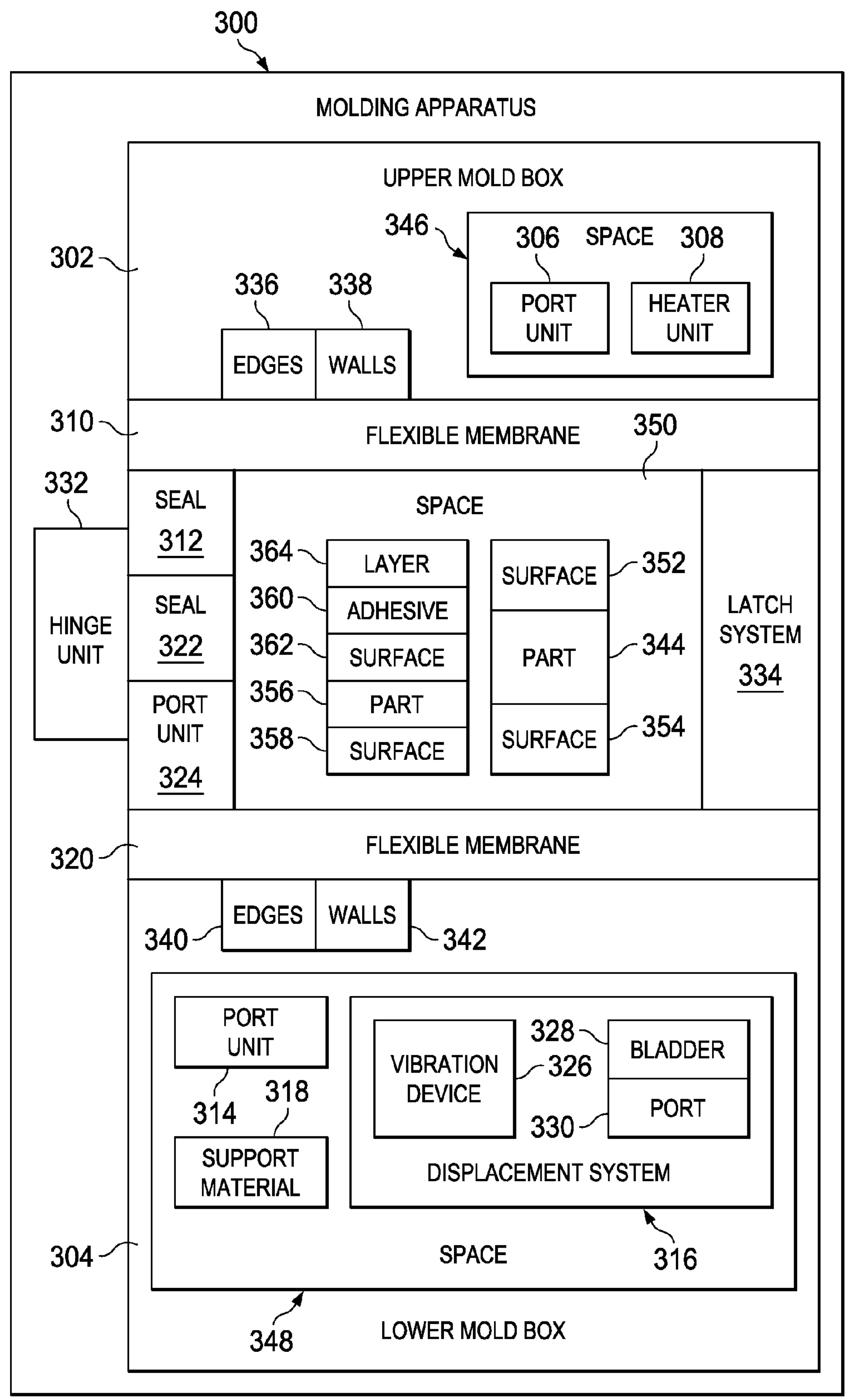
FIG. 3 is a block diagram of a molding system in accordance with an advantageous embodiment.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service.

Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

The different advantageous embodiments recognize that currently used tools may be expensive to replace or modify.

These costs may be especially high if changes to a part occur frequently or if a part is a limited run part. Additionally, the advantageous embodiments recognize that the time needed to obtain a new mold or modify a mold may interrupt and cause delays in manufacturing parts for an aircraft.

The different advantageous embodiments provide a method and apparatus for manufacturing parts. A flexible molding apparatus may have an upper mold box, a lower mold box, an upper flexible membrane, a lower flexible membrane, a heating system, a set of ports, and a displacement system. The upper flexible membrane may cover an opening of the upper mold box and the lower flexible membrane may cover an opening of the lower mold box. This flexible molding apparatus may be configured and reconfigured quickly to process and/or manufacture parts with different shapes. This reconfiguration of the molding apparatus may be performed much more quickly with much less cost as compared to current tooling systems in which molds are used.

With reference now to FIG. 3, a block diagram of a molding apparatus is depicted in accordance with an advantageous embodiment. In this depicted example, molding apparatus 300 includes upper mold box 302 and lower mold box 304. Upper mold box 302 may include port unit 306, heater unit 308, flexible membrane 310, and seal 312. Lower mold box 304 may include port unit 314, displacement system 316, support material 318, flexible membrane 320, seal 322, and port unit 324. As illustrated, displacement system 316 may include vibration device 326, bladder 328, and port 330.

In these examples, upper mold box 302 and lower mold box 304 serve as a housing and/or structure for the different components of molding apparatus 300. Upper mold box 302 and lower mold box 304 make take various shapes and forms. For example, without limitation, these mold boxes may be square, rectangular, hexagonal, trapezoidal, or some other suitable shape. In the different advantageous embodiments, rectangular and/or square shapes may be a preferred shape for upper mold box 302 and lower mold box 304.

Upper mold box 302 and lower mold box 304 may be made from different materials. For example, without limitation, upper mold box 302 and lower mold box 304 may be made from metal, metal alloys, composite materials, or any other suitable material that may minimize and/or resist deflection and/or distortion that may occur during a molding process.

Upper mold box 302 may move with respect to lower mold box 304, in these examples. Upper mold box 302 may be attached to lower mold box 304 using hinge unit 332. Hinge unit 332 may be one or more hinges that may be secured to upper mold box 302 and lower mold box 304 in a manner that allows for upper mold box 302 to move into an open and/or closed state. Upper mold box 302 and lower mold box 304 may be secured to each other in a closed state using latch system 334.

Flexible membrane 310 may cover upper mold box 302, while flexible membrane 320 may cover lower mold box 304. Flexible membrane 310 may be connected to edges 336 in upper mold box 302. Alternatively, flexible membrane 310 may be connected to walls 338 in upper mold box 302. In a similar fashion, flexible membrane 320 may be connected to edges 340 and/or walls 342 of lower mold box 304.

In these examples, flexible membrane 310 and flexible membrane 320 may be made from any material that provides for flexibility and may be air tight. Additionally, flexible membrane 310 and flexible membrane 320 may be temperature resistant and thin enough when a vacuum is applied to avoid damaging part 344, which may be placed between these flexible membranes. In these examples, part 344 may be, for example, without limitation, a master part, a production part, or some other suitable object. Flexible membrane 310 and flexible membrane 320 may be made from a material such as, for example, without limitation, a silicone sheet or some other suitable material. This type of material may be available from Mosites Rubber Company, Inc.

Seal 312 and seal 322 may engage each other when upper mold box 302 is closed with respect to lower mold box 304. When latch system 334 becomes engaged, seal 312 and seal 322 may form an air tight seal between edges 336 and 340.

Port unit 306 in upper mold box 302 may be a set of ports. A set, as used herein, referrers to one or more items. For example, without limitation, a set of ports is one or more ports. Port unit 306 may be used to pressurize space 346 within mold box 302. Heater unit 308 may be a set of heaters capable of generating heat to process part 344.

Port unit 314 in lower mold box 304 may be used to apply a vacuum to space 348 within lower mold box 304. Displacement system 316 may displace support material 318. Displacement system 316 may displace support material 318 in a number of different ways. For example, without limitation, vibration device 326 may agitate support material 318. Agitation of support material 318 may cause support material 318 to enter a pliable state, allowing support material 318 to conform and/or change shape. This pliable state may be, for example, without limitation, a fluid state.

Bladder 328 may be increased in size through port 330 to further displace support material 318. In particular, bladder 328 may increase in size to lift support material 318 upwards against flexible membrane 320. Port unit 324 may be a set of ports integrated within seal 322 to draw a vacuum in space 350 between flexible membrane 310 and flexible membrane 320.

Support material 318 may take various forms. For example, without limitation, support material 318 may take the form of pellets, spheres, or some other element that may be reconfigured in shape. In these examples, support material 318 may take the form of Macrolite® ceramic spheres, which may be obtained from Kinetico Corporation. These spheres may range in a size from around 0.020 inches to around 0.25 inches in diameter. Of course, any suitable type and/or size of support media that may be reconfigured in shape and hold a reconfigure shape may be used.

In operation, part 344 may be a master tool or part used to reconfigure molding apparatus 300. In other advantageous embodiments, part 344 may be an actual production part for processing by molding apparatus 300.

Part 344 may be placed between flexible membrane 310 and flexible membrane 320. Upper mold box 302 may be closed with respect to lower mold box 304. Latch system 334 may be engaged to form a seal between seal 312 and seal 322. A vacuum may be applied through port 324 to space 350. This vacuum may cause flexible membrane 310 and flexible membrane 320 to conform to a shape of part 344. In addition, pressure may be applied in space 346 through port unit 306 to aid in conforming flexible membrane 310 to surface 352 of part 344, and flexible membrane 320 may conform to surface 354 of part 344.

Vibration device 326 may be activated to displace support material 318. This displacement may cause support material 318 to become pliable such that support material 318 may change shape. Bladder 328 may be filled with a gas through port 330 to lift support material 318 upwards into contact with flexible membrane 320. In this manner, support material 318 also may conform to the shape of surface 354 of part 344.

Once flexible membrane 320 and support material 318 have been configured to a shape of surface 354, a vacuum may be applied to space 348 using port unit 314. This vacuum may change the state of support material 318 to a rigid and/or solid state from the pliable state. Vibration device 326 may reduce and/or cease agitation of support material 318 in addition to a vacuum being applied to space 348. In this state, support material 318 and flexible membrane 320 may retain the shape of surface 354 for part 344. At this point, pressure in space 346 may be reduced and/or released and latch system 334 may be disengaged to allow for removal of part 344. Further, the vacuum applied to space 350 may be released.

Another part, such as part 356, for example, without limitation, may be the same shape as part 344 and may be placed onto flexible membrane 320. Part 344 may be, for example, without limitation, a preform or some other part for processing. A perform may be a material that has no preliminary shaping, but is not yet in a final form or completed. In this configuration, surface 358 of part 356 may easily be held by flexible membrane 320 and support material 318. Additionally, part 356 may include adhesive 360 on surface 362. Adhesive 360 may be applied to surface 362 prior to part 356 being placed onto flexible membrane 320. In other advantageous embodiments, adhesive 360 may be placed onto surface 362 after part 356 has been placed onto flexible membrane 320. In this example, layer 364 may be laid across seal 322.

Upper mold box 302 may be closed, and latch system 334 may be engaged. A vacuum may be applied to space 350. This vacuum may occur between layer 364 and flexible membrane 320 in this example. Additionally, pressure also may be applied to space 346 to cause flexible membrane 310 to conform to surface 362 of part 356.

As a result, layer 364 may be pushed or placed against adhesive 360 on part 356. Heat may be generated by heater unit 308 to activate adhesive 360. In these examples, adhesive 360 may be a heat activated adhesive. Of course, other types of adhesives may be used, such as, for example, without limitation, pressure sensitive or contact adhesives, depending on the particular implementation.

Heater unit 308 may continue to apply heat until adhesive 360 secures layer 364 to surface 362. Afterwards, heat may be discontinued and the pressure applied to space 346 and the vacuum applied to space 350 may be discontinued. At this point, latch system 334 may be disengaged and upper mold box 302 may be opened to remove part 356. At this point, another similar part may be processed in a similar fashion. While processing parts having the same shape as part 344 with molding apparatus 300, the vacuum may be maintained in space 348 and bladder 328 may remain filled (regulated) to maintain support material 318 and flexible membrane 320 in the configured shape.

If a part with a different shape is to be processed, the vacuum applied to space 348 may be removed and bladder 328 may be deflated to ready molding apparatus 300 for reconfiguration to another shape for another part.

Figure 4:
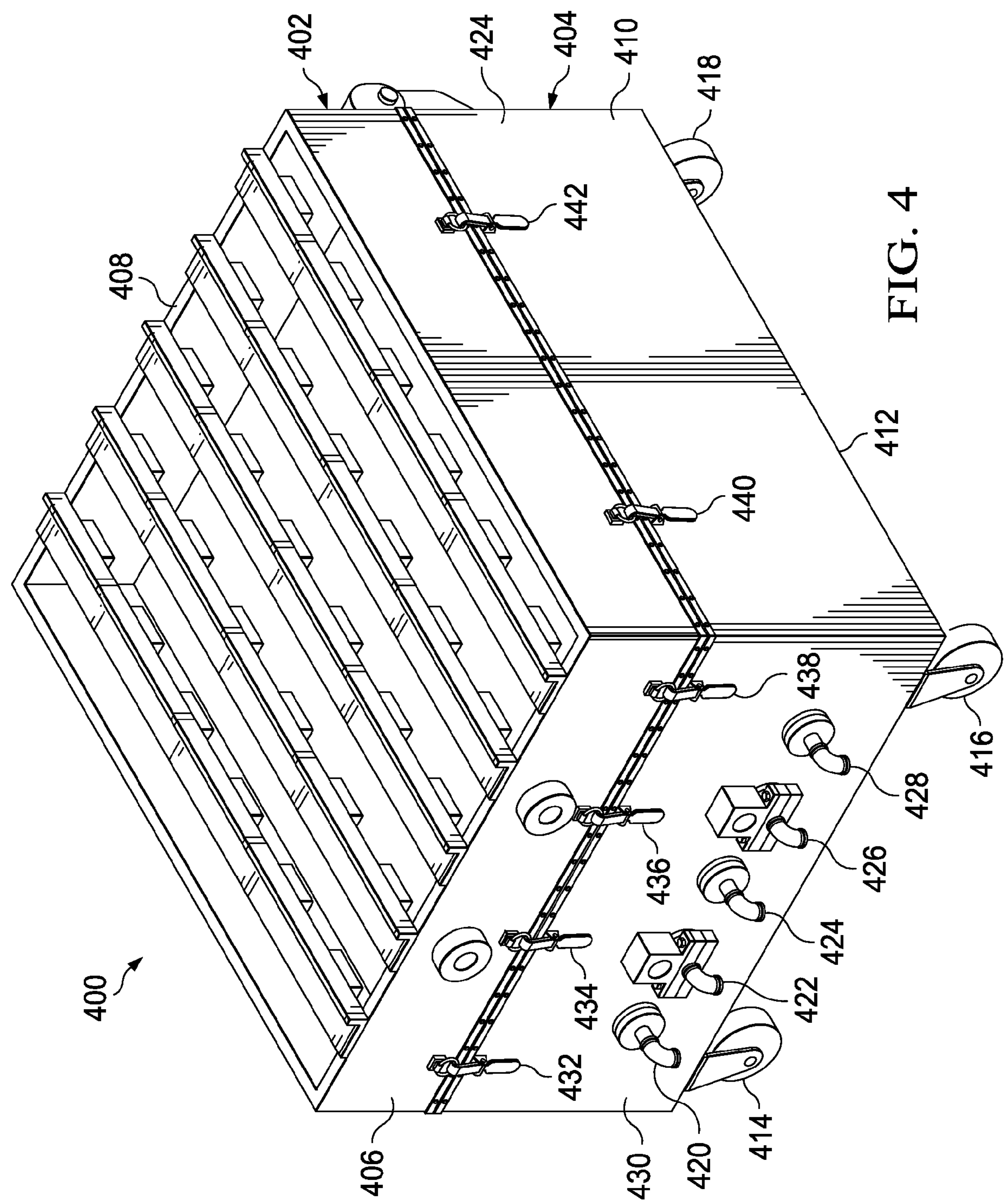
FIG. 4 is a diagram illustrating a perspective view of a molding apparatus in accordance with an advantageous embodiment.

With reference now to FIG. 4, a diagram illustrating a perspective view of a molding apparatus is depicted in accordance with an advantageous embodiment. Molding apparatus 400 may be an example of one advantageous embodiment of molding apparatus 300 in FIG. 3.

As illustrated, molding apparatus 400 includes upper mold box 402 and lower mold box 404. As can be seen, from this illustration, upper mold box 402 includes walls 406, which includes walls that extend downward from top 408. Walls 406, in these examples, may be four walls in which each pair of walls oppose each other. Lower mold box 404 also may have opposing walls 410, which may extend upward from base 412. In this illustrative example, wheels 414, 416, and 418 may be attached to base 412, and may provide mobility and/or portability for molding apparatus 400. An additional wheel, not shown in this view, also may be connected to base 412.

In these examples, vibration units 420, 422, 424, 426, and 428 may be present within wall 430, extend through space 348 in FIG. 3 of lower mold box 404 in FIG. 4, and may be similarly present in the opposing wall of lower mold box 404. Additionally, these vibration units also may provide a connection to displace the support media within lower mold box 404. Additionally, latches 432, 434, 436, 438, 440, and 442 may be present on wall 424 of walls 410. These latches may be part of latch system 334, such as latch system 334 in FIG. 3, and may be used to secure upper mold box 402 to lower mold box 404.

Figure 5:
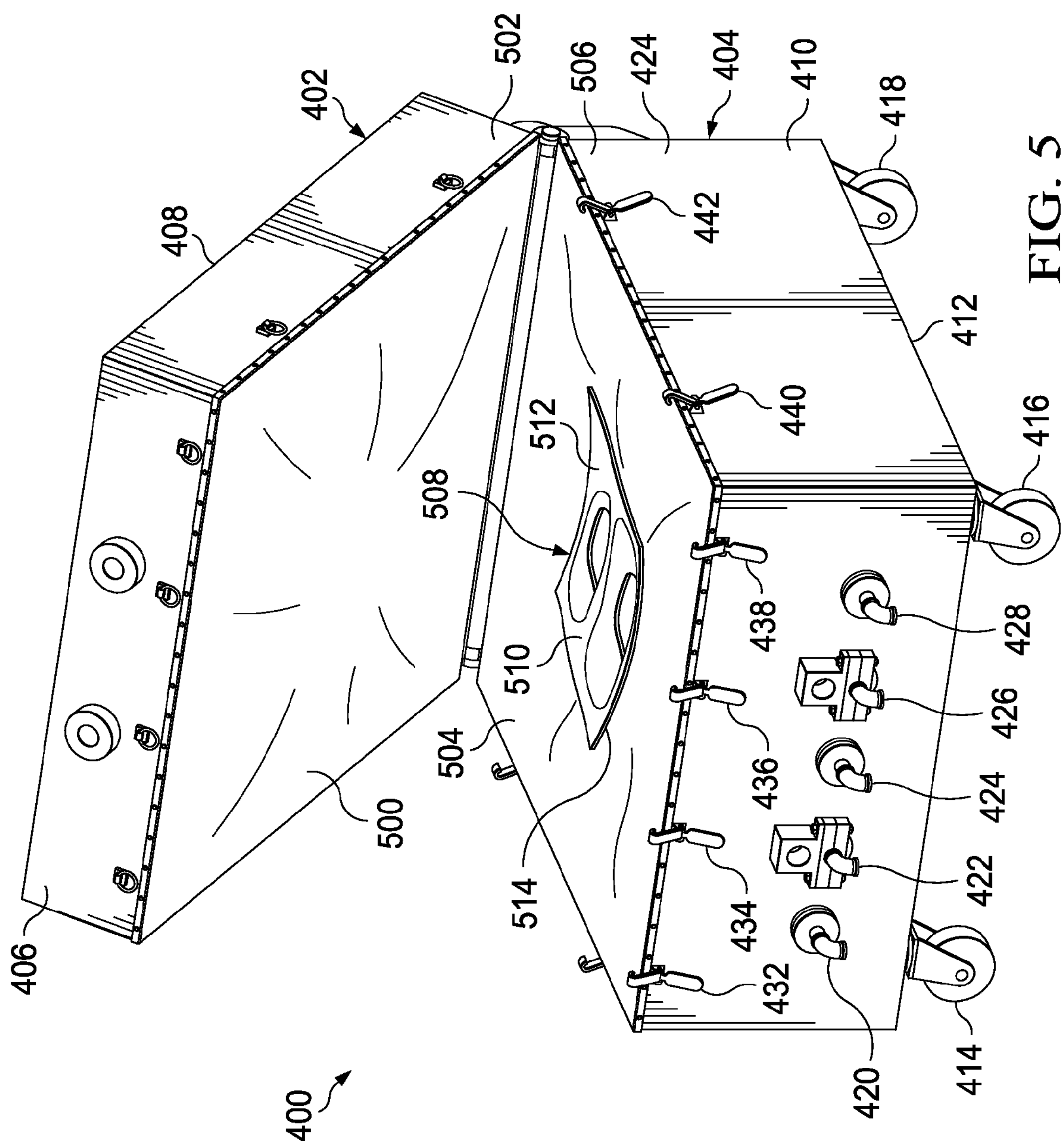
FIG. 5 is a diagram illustrating a molding apparatus with a part in accordance with an advantageous embodiment.

Turning now to FIG. 5, a diagram illustrating a molding apparatus with a part is depicted in accordance with an advantageous embodiment. In this example, molding apparatus 400 is shown in an open state in which upper mold box 402 is shown in a raised position with respect to lower mold box 404.

In this view of molding apparatus 400, flexible membrane 500 is shown covering lower portion 502 of upper mold box 402. Flexible membrane 504 is shown as covering upper portion 506 of lower mold box 404.

In this illustrative example, part 508 may be a mold master. Part 508 may be placed on flexible membrane 504. With part 508 in place on flexible membrane 504, upper mold box 402 may be moved into a closed position to create an imprint of contoured surfaces 510 on part 508. Contoured surfaces 510 may be both on upper surface 512 and lower surface 514 of part 508. Contoured surfaces 510 may be configured and/or imprinted in both flexible membrane 500 and flexible membrane 504, in these examples.

Molding apparatus 400 may create an imprint of a particular shape of lower surface 514 for part 508 on flexible membrane 504. In other words, molding apparatus 400 may be configured as a mold to process parts that may have a shape similar to part 508. Further, molding apparatus 400 also may be quickly reconfigured to adapt and form a surface to a contour for a different shape. In this manner, the reconfiguration of molding apparatus 400 may provide a complex, contoured surface for a variety of shapes using molding apparatus 400. This type of configuration and/or reconfiguration of molding apparatus 400 may occur in a short period of time with little cost, as compared to currently used molding systems.

Figure 6:
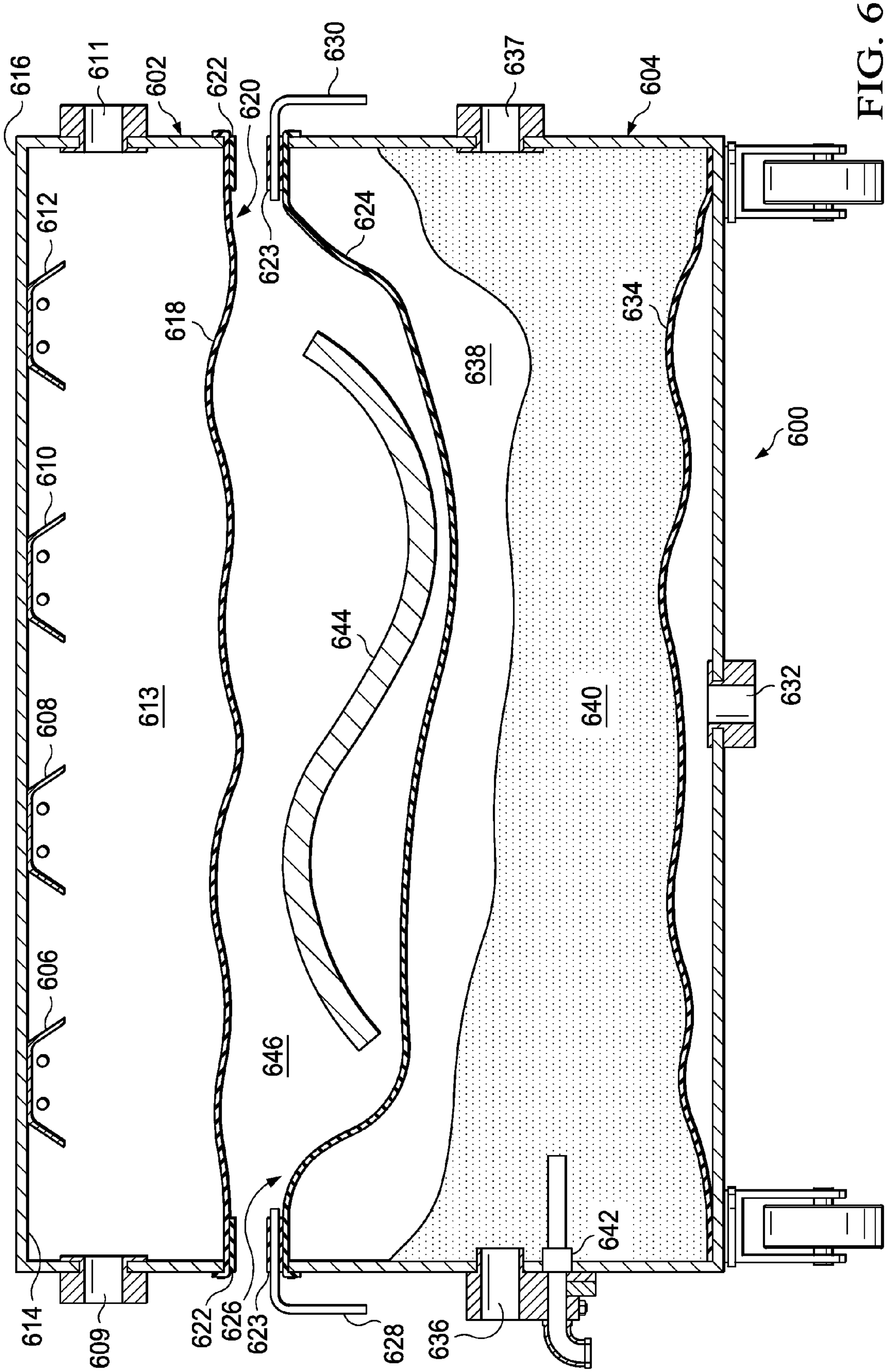
FIG. 6 is a diagram illustrating components in a molding apparatus in accordance with an advantageous embodiment.

With reference now to FIGS. 6-11, diagrams illustrating operations to configure a molding apparatus are depicted in accordance with an advantageous embodiment. In FIG. 6, a diagram illustrating a cross-sectional view of a molding apparatus is depicted in accordance with an advantageous embodiment.

In this example, molding apparatus 600 is an example of another advantageous embodiment of molding apparatus 300 in FIG. 3. In this example, molding apparatus 600 may have upper mold box 602 and lower mold box 604. Upper mold box 602 may include heaters 606, 608, 610, and 612, which may be mounted on inner surface 614 of top 616. Additionally, upper flexible membrane 618 covers opening 620 of upper mold box 602. Additionally, seal 622 may be located over a portion of upper flexible membrane 618. Upper mold box 602 also may include port 609 and port 611. These ports may be used to pressurize space 613 within upper mold box 602.

Lower mold box 604 may include lower flexible membrane 624, which covers opening 626 of lower mold box 604. Lower mold box 604 also may include vacuum pipes 628 and 630. In this particular example, vacuum pipes 628 and 630 may pass through seal 623. These vacuum pipes may apply a vacuum in any space that may be between upper flexible membrane 618 and lower flexible membrane 624 when upper mold box 602 is in a closed position with respect to lower mold box 604. Additionally, seal 623 may be located over a portion of lower flexible membrane 624. Seal 623 may be positioned relative to seal 622, such that an air tight seal may be present when upper mold box 602 is placed into a closed position with respect to lower mold box 604.

Lower mold box 604 may include port 632 and bladder 634. Port 632 may be used to introduce and remove air from bladder 634. Additionally, vacuum pipe 636 and vacuum pipe 637 also may be present within lower mold box 604 to apply a vacuum in space 638.

In this example, support material 640 may be placed in space 638 within lower mold box 604 under lower flexible membrane 624. Vibration unit 642 also may be present within space 638. Vibration unit 642 may operate to cause support material 640 to change form or shape. In particular, vibration unit 642 may cause support material 640 to take a pliable state.

Support material 640 may be considered to be in a pliable state when support material 640 becomes capable of continually deforming or flowing. This flowing or deformation may occur under applied shear stress regardless of the amount of applied stress. In these examples, vibration unit 642 and bladder 634 may form a displacement system, such as, for example, without limitation, displacement system 316 in FIG. 3.

In this example, master part 644 may be placed in space 646 between lower flexible membrane 624 and upper flexible membrane 618. Master part 644 is an example of one implementation of part 344 in FIG. 3. In this example, master part 644 may be a master mold shape for a part to be processed. In other advantageous embodiments, master part 644 may be an actual production part.

Figure 7:
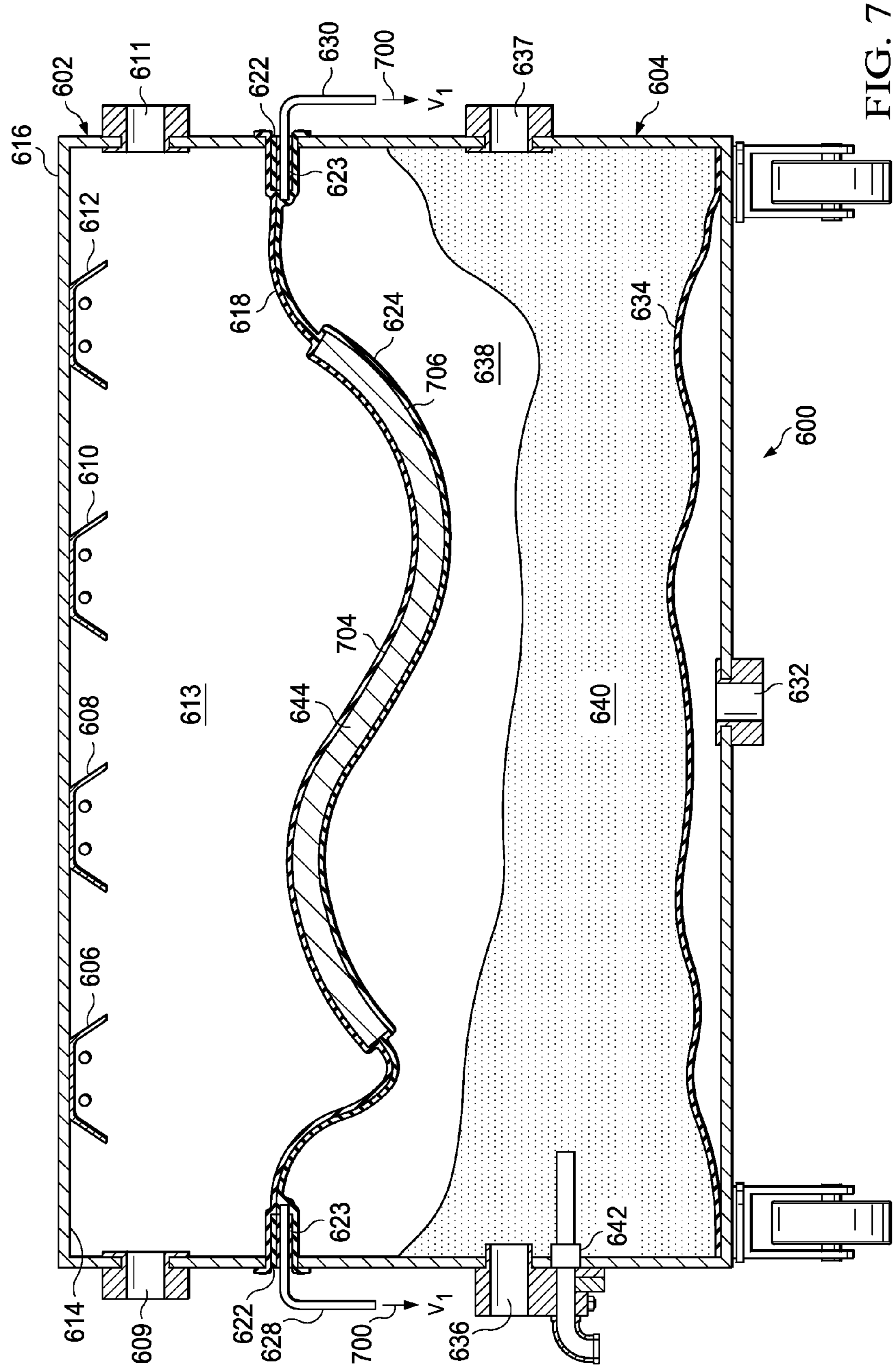
FIG. 7 is a diagram illustrating operations to configure a molding apparatus in accordance with an advantageous embodiment.

In FIG. 7, upper mold box 602 may be moved into a closed position with respect to lower mold box 604. Vacuum 700 may be applied in space 646, which may be between upper flexible membrane 618 and lower flexible membrane 624 where master part 644 is located. As can be seen, in this example, upper flexible membrane 618 and lower flexible membrane 624 may conform to the shape of master part 644. In particular, upper flexible membrane 618 may conform to surface 704 of master part 644, while lower flexible membrane 624 may conform to surface 706 of master part 644.

Figure 8:
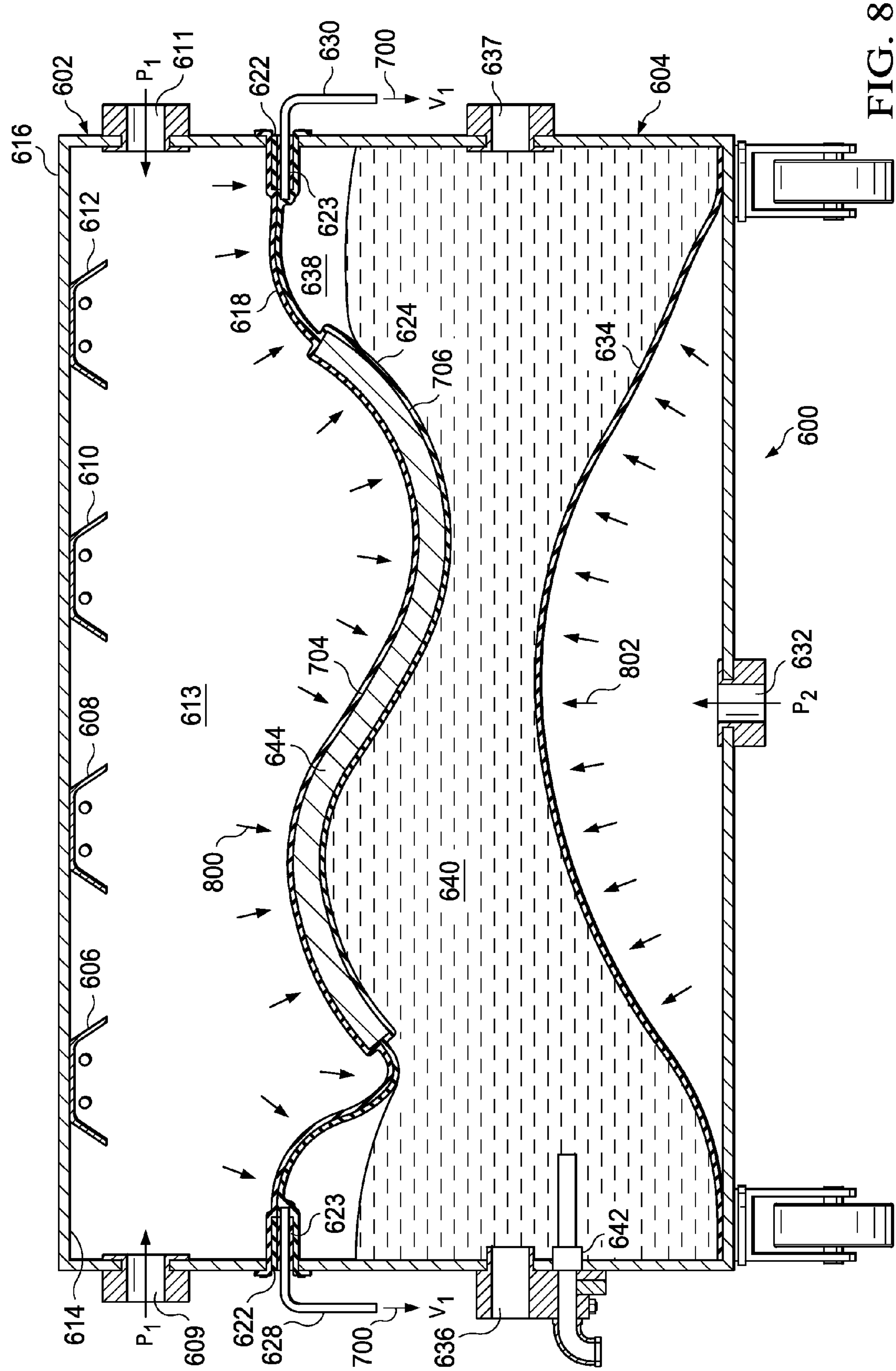
FIG. 8 is a diagram illustrating operations to configure a molding apparatus in accordance with an advantageous embodiment.

In FIG. 8, inflation pressure 800 may be applied within upper mold box 602 by introducing air and/or some other suitable gas into space 613 through ports 609 and 611. Inflation pressure 800 may cause upper flexible membrane 618 to contact surface 704 and/or more securely contact surface 704 of master part 644. Support material 640 may be agitated using vibration unit 642 to enter a pliable state. Pressure 802 may be applied to bladder 634 through port 632. This application of pressure may increase the size of bladder 634. As a result, support material 640 may move to conform to lower flexible membrane 624, which may have the shape of master part 644. A reduced vacuum is concurrently applied to space 638 through vacuum pipe 636 and vacuum pipe 637 to further enhance the motion of support material 640 to conform to lower flexible membrane 624.

Figure 9:
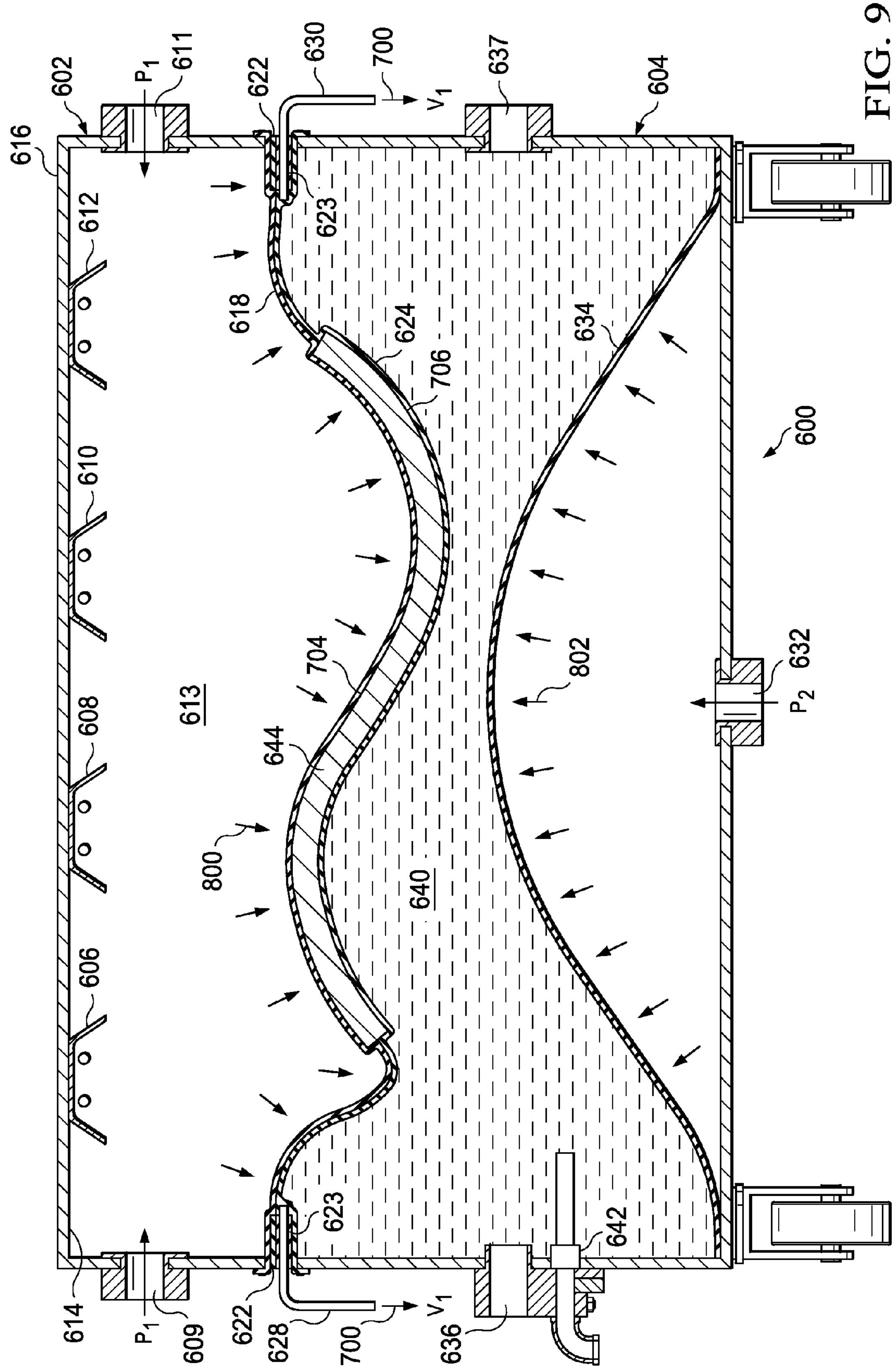
FIG. 9 is a diagram illustrating operations to configure a molding apparatus in accordance with an advantageous embodiment.

In FIG. 9, pressure 802 may continue, now in a regulated manner, to be applied to bladder 634 through port 632 to raise the level of support material 640 to cause further contact and conformance in a shape within lower flexible membrane 624. At this point, the agitation of support material 640 may be reduced to reduce the pliability of support material 640. In this step, full vacuum 900 may be applied through vacuum pipe 628 and vacuum pipe 630.

Figure 10:
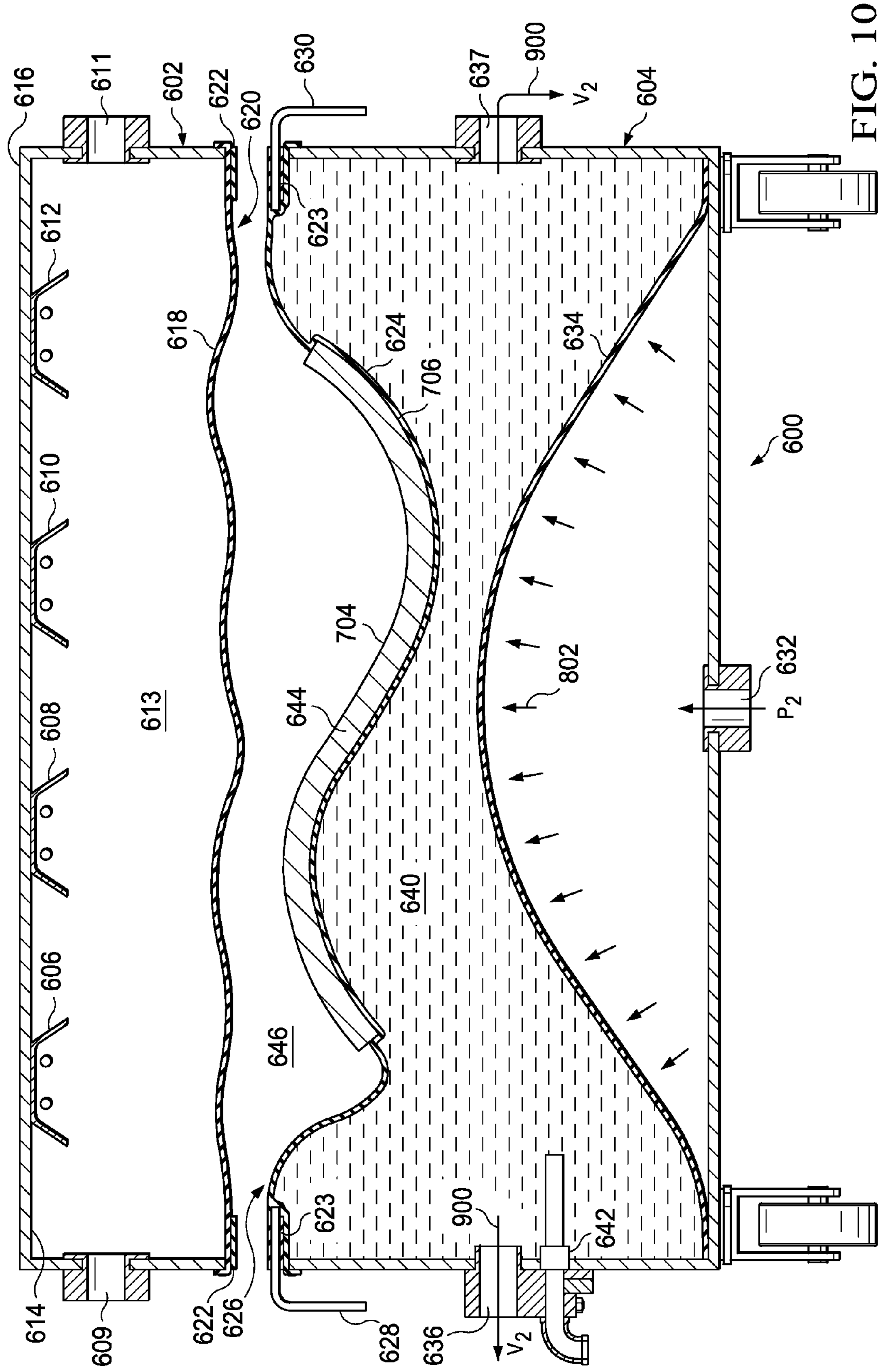
FIG. 10 is a diagram illustrating operations to configure a molding apparatus in accordance with an advantageous embodiment.

In FIG. 10, vacuum 700, applied through vacuum pipes 628 and 630, may be released such that a vacuum may no longer be present in space 646 between upper flexible membrane 618 and lower flexible membrane 624. Further, inflation pressure 800, applied through ports 609 and 611, also may be released. At this point, upper mold box 602 may be opened.

Figure 11:
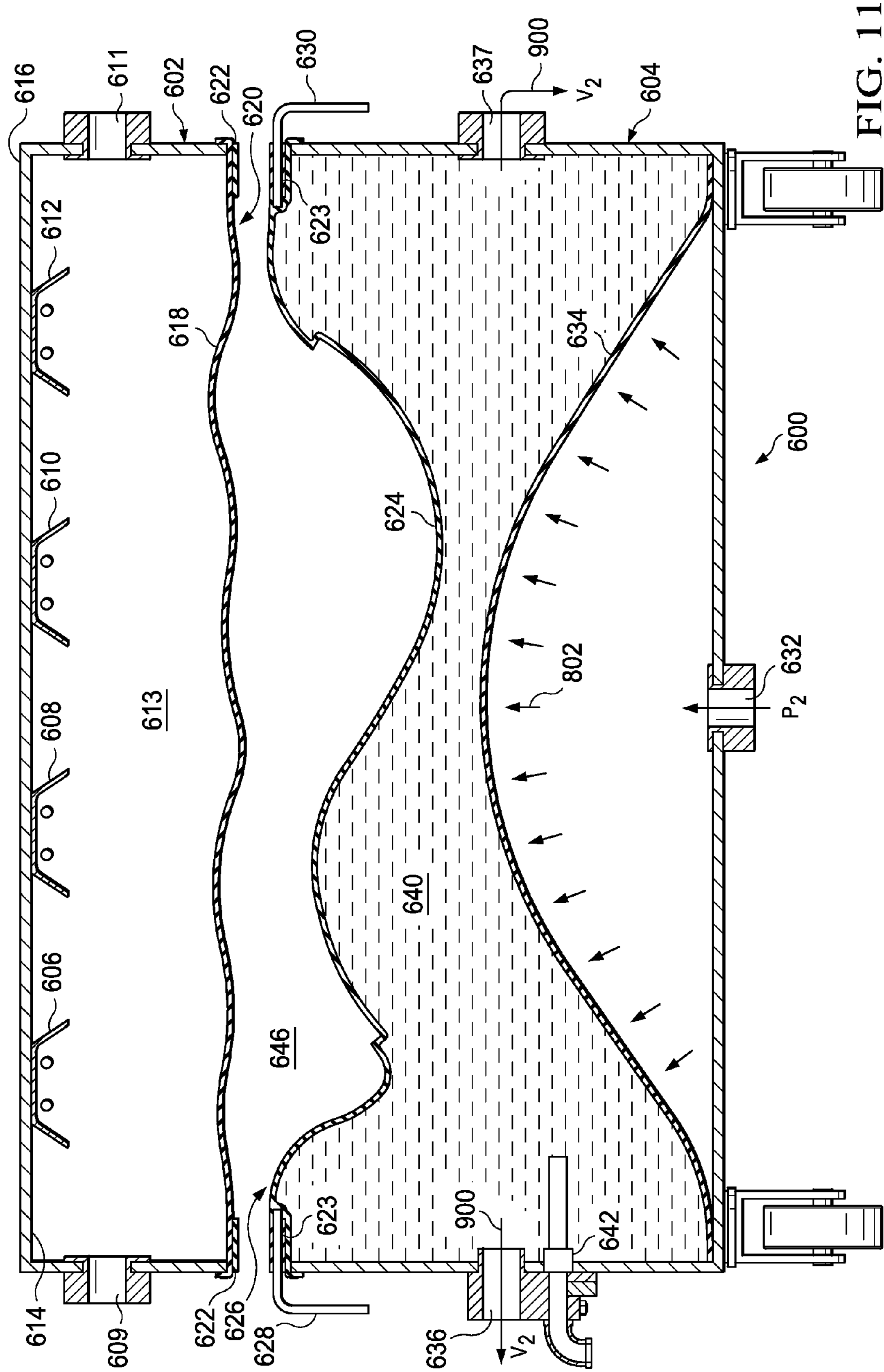
FIG. 11 is a diagram illustrating operations to configure a molding apparatus in accordance with an advantageous embodiment.

In FIG. 11, master part 644 may be removed. At this point, molding apparatus 600 may be configured and ready to process parts having a shape similar to master part 644.

With reference now to FIGS. 12-16, diagrams illustrating the processing of a part are depicted in accordance with an advantageous embodiment. In this example, preform 1200 is an example of one implementation for part 356 in FIG. 3. Preform 1200 is an example of a part that may be processed using a decorative lamination process with molding apparatus 600 in its configured condition.

Figure 12:
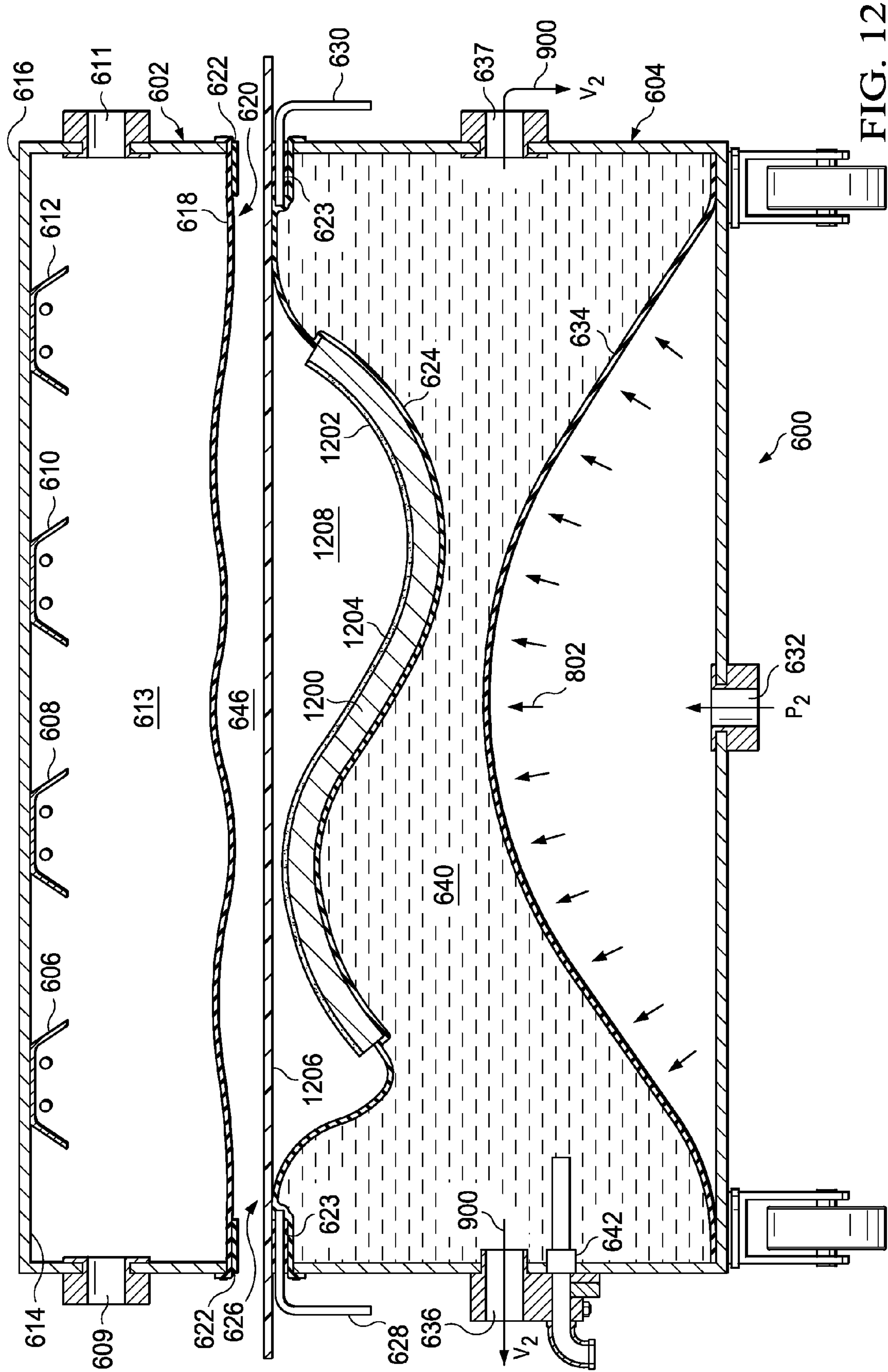
FIG. 12 is a diagram illustrating operations to configure a molding apparatus in accordance with an advantageous embodiment.

In FIG. 12, preform 1200 may be placed onto lower flexible membrane 624 within molding apparatus 600 in the configured condition. Preform 1200 may easily fit onto lower flexible membrane 624 in the configured condition.

Additionally, adhesive 1202 may be placed on surface 1204 of preform 1200. Adhesive 1202 may be place on surface 1204 prior to and/or after preform 1200 has been placed onto lower flexible membrane 624. In this operation, decorative layer 1206 may be placed across seal 623 of lower mold box 604. Space 1208 may be present between decorative layer 1206 and preform 1200.

In this example, adhesive 1202 may be, for example, without limitation, a heat activated adhesive. Of course, other types of adhesives may be used. For example, without limitation, a pressure sensitive adhesive, a ultra-violet light adhesive, a light activated adhesive, or some other suitable adhesive may be used. With the use of other adhesives, an activation mechanism other than heaters 606, 608, 610, and 612 may be used. For example, without limitation, with the use of a ultra-violet light activated adhesive, ultra-violet lights may be used in place of the heaters.

Figure 13:
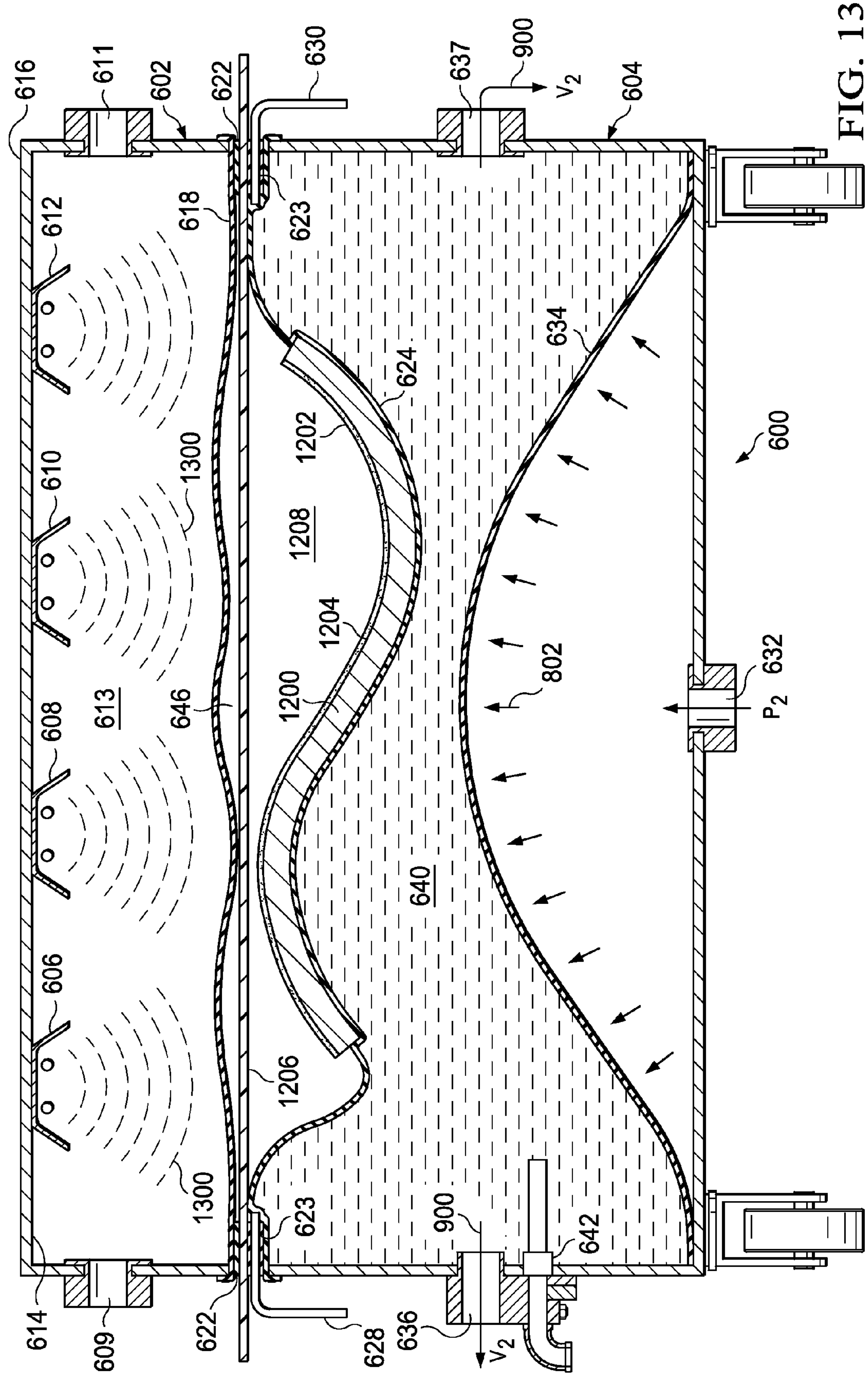
FIG. 13 is a diagram illustrating the processing of a part in accordance with an advantageous embodiment.

In FIG. 13, upper mold box 602 may be closed such that seal 622 contacts seal 623. Upper mold box 602 may be secured to lower mold box 604, in this example, to create an airtight seal. Heat 1300 may be generated using heaters 606, 608, 610, and 612. As can be seen, in these examples, heat 1300 penetrates through upper flexible membrane 618 into adhesive 1202 and/or preform 1200. Heat 1300 may activate adhesive 1202 in this example.

Figure 14:
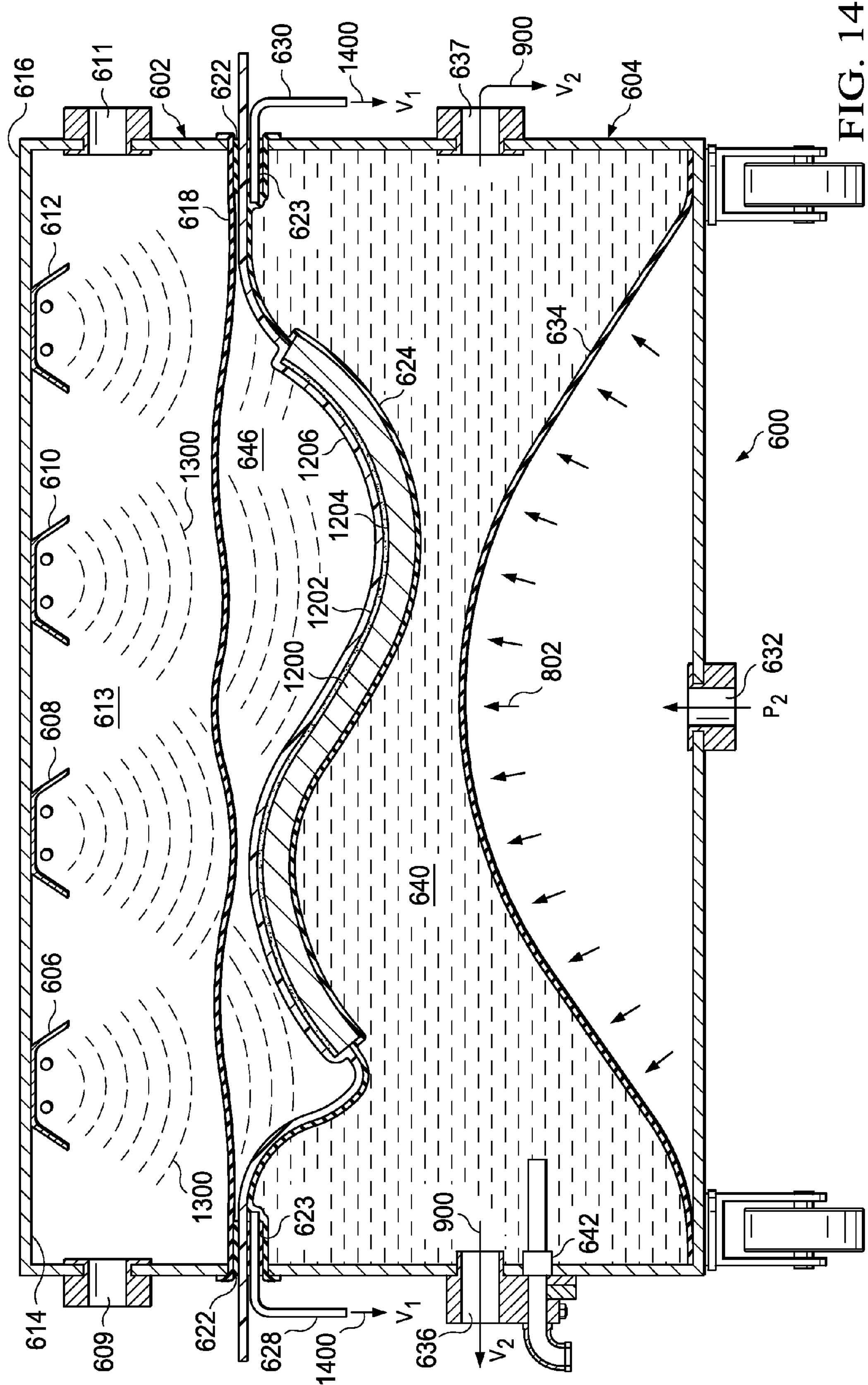
FIG. 14 is a diagram illustrating the processing of a part in accordance with an advantageous embodiment.

In FIG. 14, vacuum 1400 may be applied through vacuum pipes 628 and 630 in a manner that may cause decorative layer 1206 to adhere to and/or contact adhesive 1202 and/or preform 1200.

Figure 15:
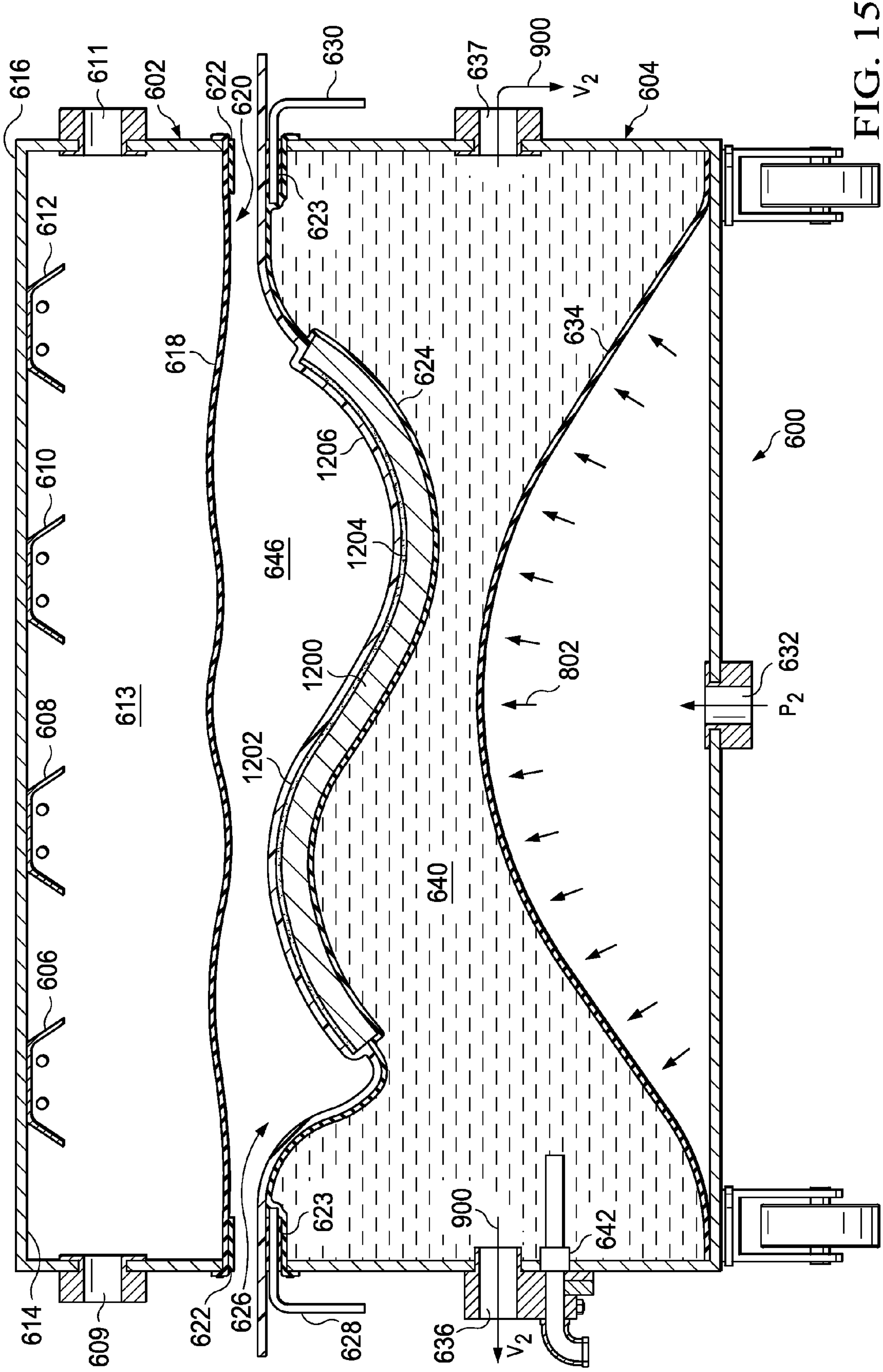
FIG. 15 is a diagram illustrating the processing of a part in accordance with an advantageous embodiment.

In FIG. 15, the generation of heat 1300 may cease. Additionally, vacuum 1400, applied through vacuum pipes 628 and 630, may be removed. Upper mold box 602 may be raised with respect to lower mold box 604. Preform 1200, with decorative layer 1206 attached to preform 1200, through adhesive 1202, may be removed.

Figure 16:
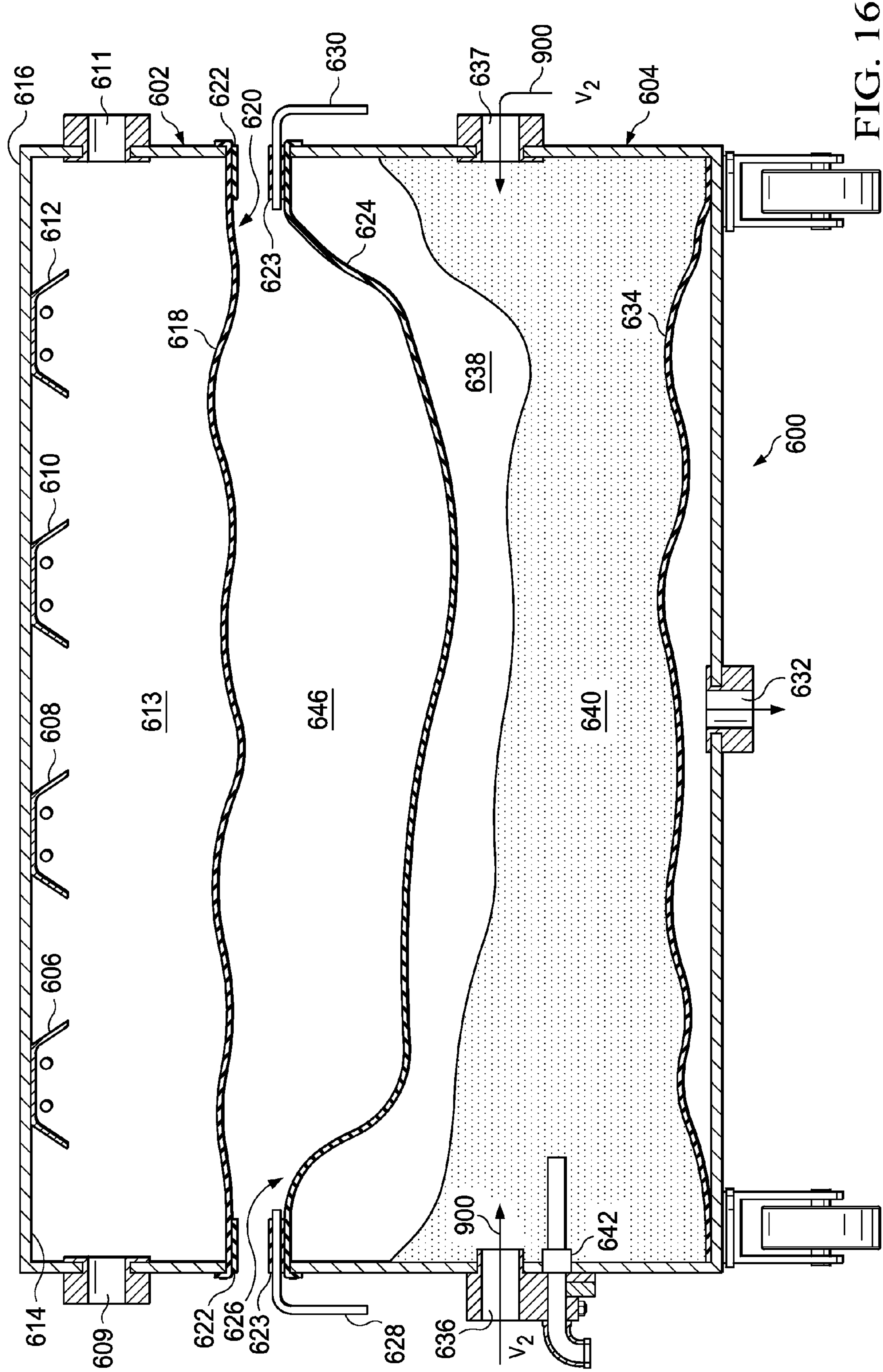
FIG. 16 is a diagram illustrating the processing of a part in accordance with an advantageous embodiment.

In FIG. 16, vacuum 900 and pressure 802 may be released. At this point, molding apparatus 600 may be reconfigured for a different shape and/or part. If the same shape is used, then vacuum 900 and pressure 802 may be maintained.

Figure 17:
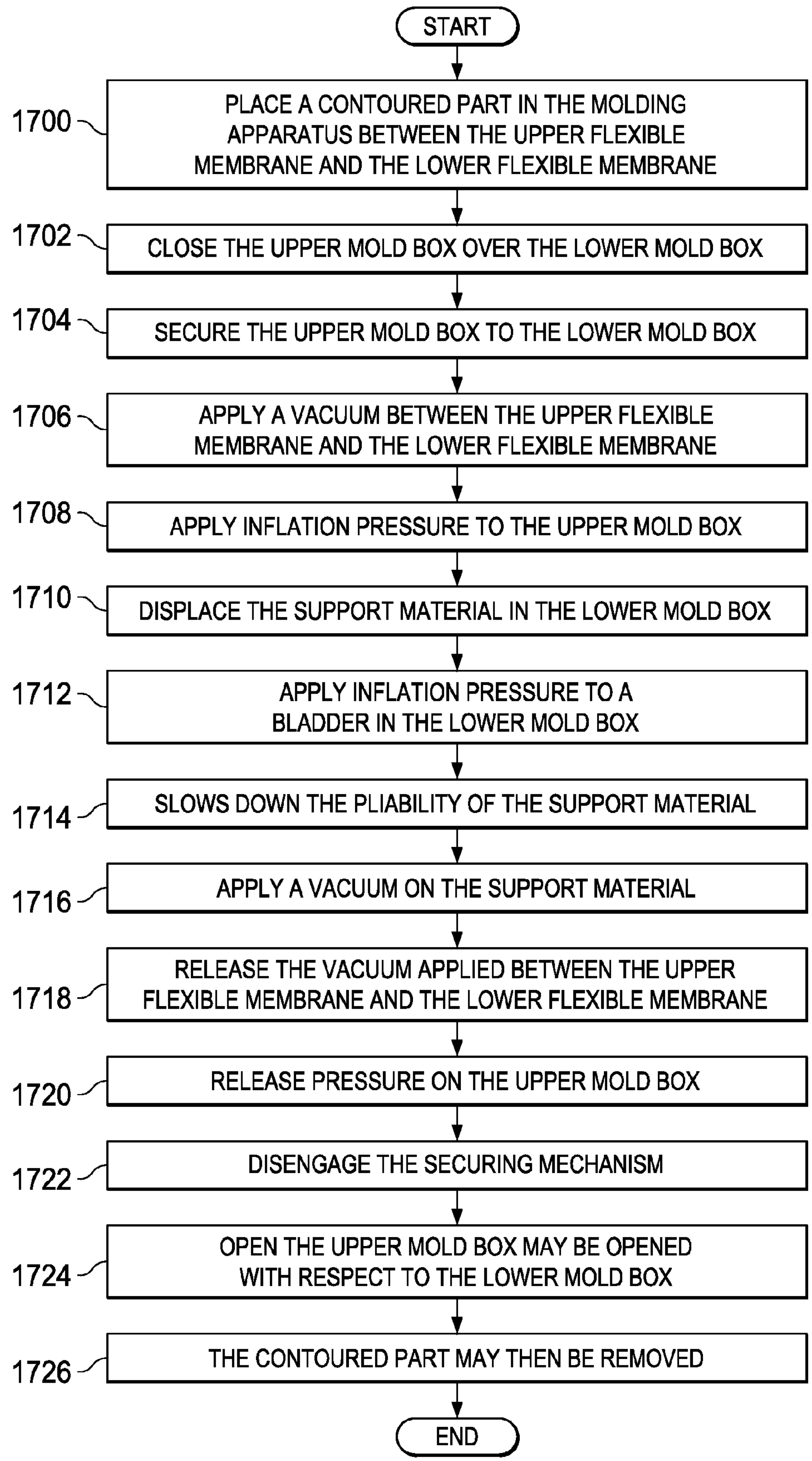
FIG. 17 is a flowchart of a process to configure a molding apparatus in accordance with an advantageous embodiment.

With reference now to FIG. 17, a flowchart of a process to configure a molding apparatus is depicted in accordance with an advantageous embodiment. The process illustrated in FIG.

17 may be used to configure a molding apparatus, such as molding apparatus 300 in FIG. 3 for use in manufacturing and/or processing a part.

The process begins with placement of a contoured part in the molding apparatus between the upper flexible membrane and the lower flexible membrane (operation 1700). The contoured part may be, for example, without limitation, master part 644 as shown in FIG. 6. The upper mold box may be closed over the lower mold box (operation 1702). The upper mold box may be secured to the lower mold box (operation 1704). The upper mold box may be secured to the lower mold box using various securing mechanisms such as, for example, without limitation, latches or other securing mechanisms.

A vacuum may be applied between the upper flexible membrane and the lower flexible membrane (operation 1706). This vacuum may cause the upper flexible membrane and the lower flexible membrane to conform and/or take the shape of the contoured part. Inflation pressure may be applied to the upper mold box (operation 1708).

The process also may displace the support material in the lower mold box (operation 1710). In operation 1710, the support material may be displaced in these examples through agitation using a vibration unit. In this particular example, the support material may take the form of Macrolite® spheres and/or beads. The process also may apply inflation pressure to a bladder in the lower mold box (operation 1712). By increasing the size of the bladder in the lower mold box, the bladder may inflate to raise the support material towards and/or against the lower flexible membrane. This bladder also may be considered part of the displacement apparatus for the support material.

The process may slow down the pliability of the support material (operation 1714). In this operation, the agitation of the support material may be reduced to decrease the pliability or moveability of the support material. The process also may apply a vacuum on the support material (operation 1716). Operation 1716 may rigidize and/or solidify the support material units contoured shape against a flexible membrane. In this manner, the contoured shape of the flexible membrane in the lower mold box and the support material will retain the shape of the contoured part.

The process may release the vacuum applied between the upper flexible membrane and the lower flexible membrane (operation 1718). The process also may release pressure on the upper mold box (operation 1720). The securing mechanism holding the upper mold box in place with respect to the lower mold box may be disengaged (operation 1722), and the upper mold box may be opened with respect to the lower mold box (operation 1724). The contoured part may be removed (operation 1726) with the process terminating thereafter. At this time, the molding apparatus configured for use in processing part having a shape similar to the contoured part.

Figure 18:
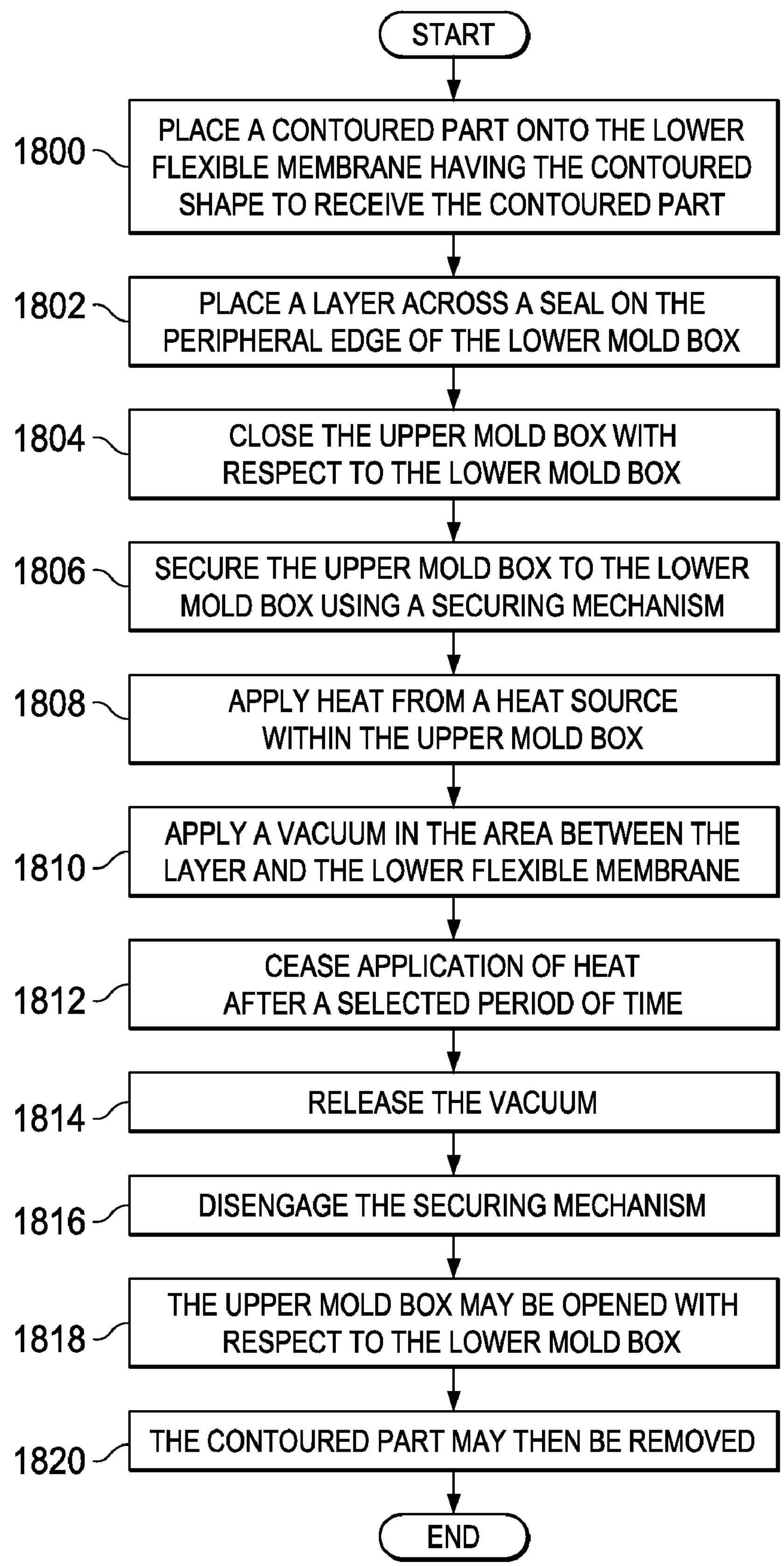
FIG. 18 is a flowchart of a process for processing a part in accordance with an advantageous embodiment.

With reference now to FIG. 18, a flowchart of a process for processing a part is depicted in accordance with an advantageous embodiment. The process illustrated in FIG. 18 may be performed using a molding apparatus such as molding apparatus 300 in FIG. 3 in a configured state.

The process begins with placement of a contoured part onto the lower flexible membrane having the contoured shape to receive the contoured part (operation 1800). The contoured part may be preform 1200 in FIG. 12 and may have an activated adhesive, such as adhesive 1202 in FIG. 12, which may have been previously applied before placement of the contoured part onto the lower flexible membrane. In other advantageous embodiments, this adhesive may be applied after the contoured part has been placed into the molding apparatus.

The process then may place a layer across the seal along the peripheral edge of the lower mold box (operation 1802). This seal may be, for example, without limitation, seal 623 in FIG. 6. In these examples, this layer may be, for example, without limitation, decorative layer 1206 in FIG. 12. This layer may be implemented using, for example, without limitation, a Tedlar® decorative film or layer. Tedlar® films may be available from E.I. du pont de Nemours and company. Tedlar® is a registered trademark of E.I. du pont de Nemours and company. Thereafter, the upper mold box may be closed with respect to the lower mold box (operation 1804). The process then may secure the upper mold box to the lower mold box using a securing mechanism (operation 1806). Latch system 334 in FIG. 3 is one non-limiting example of a securing mechanism that may be used.

Next, heat may be applied from a heat source within the upper mold box (operation 1808). Additionally, a vacuum may be applied in the area between the layer and the lower flexible membrane (operation 1810). This vacuum may be applied between the layer and the flexible membrane to cause the layer to conform to the shape of the contoured part. The heat in operation 1808 may activate the heat activated adhesive in a manner that bonds the layer to the contoured part. Application of heat may be ceased after a selected period of time (operation 1812). The vacuum may then released (operation 1814). Next, the securing mechanism may be disengaged (operation 1816), and the upper mold box may be opened with respect to the lower mold box (operation 1818). The process contoured part may then be removed (operation 1820) with the process terminating thereafter.

With reference now to FIG. 19, a process for deconfiguring a molding apparatus is depicted in accordance with an advantageous embodiment. If the current configuration for the molding apparatus is no longer needed, this process may be implemented to allow a new configuration to be made in molding apparatus 300 in FIG. 3.

The process begins by releasing the vacuum on the support material on the lower mold box (operation 1900). The process may release the pressure on the bladder in the lower mold box (operation 1902). By releasing the vacuum and the pressure, the support material may then be ready to be redisplaced and/or formed for the next part.

The different operations illustrated in the flowcharts may illustrate the architecture, functionality, and operation of some possible implementations of methods and apparatus for processing part. In some alternative implementations, the operation or operations noted in the blocks may occur out of order. For example, in some cases, two operations show in succession may be executed substantially concurrently. In other advantageous embodiments, two operations illustrated in the blocks may be executed in reverse order, depending on the functionality involved.

Thus, the different advantageous embodiments provide a method and apparatus for processing parts. In the different advantageous embodiments, a molding apparatus and a method may be provided to configure a tool to process a part. The molding apparatus, in the illustrative examples, may be configured to process a part having a particular shape without requiring a new tool or modifications that may require time and expense as compared to currently used molding systems.

Further, in the different advantageous embodiments, a single molding apparatus may be reconfigured after a set number of uses much more quickly than currently available molding systems. Thus, the different advantageous embodiments may reduce interruptions in the processing or manufacturing of a part. Further, the different advantageous embodiments also may provide for a reduced cost in manufacturing parts because new molds may not be required each time new shape is present for a part.

The description of the different advantageous embodiments has been presented for purposes of illustration and description, and is not intended to be exhaustive or limited to the embodiments in the form disclosed. Many modifications and variations will be apparent to those of ordinary skill in the art. In these different advantageous embodiments, a decorative layer may be placed and secured to a part in processing a part using a mold. In other advantageous embodiments, other components may be processed. Other parts that may be processed include, for example, without limitation, protective films, art work, hard rigid fixtures, hooks, latches, window reveals, and other suitable components may be attached to a part. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing parts, the method comprising:

placing a master part between an upper flexible membrane and a lower flexible membrane in a molding apparatus;

applying a vacuum between the upper flexible membrane and the lower flexible membrane;

displacing a support material located under the lower flexible membrane to conform to a shape of the master part to form a conformed surface; and stiffening the support material after the support material has conformed to the shape of the master part to form the conformed surface such that the support material and the lower flexible membrane substantially maintain the conformed surface;

compacting the support material such that the support material and the lower flexible membrane substantially maintain the conformed surface by applying a second vacuum to the support material.

2. The method of claim 1 further comprising:

applying pressure to the upper flexible membrane.

3. The method of claim 1 further comprising:

removing the master part.

4. The method of claim 3 further comprising:

placing a preform on the conformed surface;

placing a layer over the preform; and applying the vacuum between the preform and the layer, wherein the layer conforms to a surface of the preform.

5. The method of claim 4, further comprising:

placing a layer of a heat activated adhesive on the surface of the preform; and applying heat to the heat activated adhesive.

6. The method of claim 5 further comprising:

releasing the vacuum applied between the preform and the layer after the heat activated adhesive has attached the layer to the preform.

7. The method of claim 4, wherein the layer is a decorative layer.

8. The method of claim 1, wherein the displacing step comprises:

agitating the support material; and inflating a bladder located under the support material.

9. The method of claim 1, wherein the support material comprises a plurality of spheres.

10. A method for processing aircraft parts, the method comprising:

placing a master part between an upper flexible membrane and a lower flexible membrane in a molding apparatus;

applying a vacuum between the upper flexible membrane and the lower flexible membrane to conform the upper flexible membrane and the lower flexible membrane to a mold shape of the master part;

displacing a support material located under the lower flexible membrane to conform to the mold shape of the master part to form a conformed surface by agitating the support material and inflating a bladder located under the support material the support material comprising a plurality of spheres;

applying pressure to the upper flexible membrane;

stiffening the support material after the support material has conformed to the mold shape of the master part to form the conformed surface by applying a second vacuum to the support material in which the second vacuum compacts the support material such that the support material and the lower flexible membrane substantially maintain the conformed surface;

removing the master part after the conformed surface has been formed and the support material has been stiffened;

placing a layer of a heat activated adhesive on the surface of a preform;

placing the preform on the conformed surface;

placing a decorative layer over the preform;

applying the vacuum between the preform and the decorative layer, wherein the decorative layer conforms to a surface of the preform;

applying heat to the heat activated adhesive; and releasing the vacuum applied between the preform and the decorative layer after the heat activated adhesive has attached the decorative layer to the preform.

11. The method of claim 1, wherein the molding apparatus is used to process parts.

12. The method of claim 1, wherein the molding apparatus is used to conform layers to parts.

13. The method of claim 1, wherein the upper flexible membrane and the lower flexible membrane conform to the shape of the master part.

* * * * *